Oct. 13, 1942.　　　C. F. HADDEN　　　2,298,761
CONTROL DEVICE
Filed Oct. 14, 1941　　　6 Sheets-Sheet 1

Inventor
CALLENDER F. HADDEN,
By Clarence A. O'Brien
Attorney

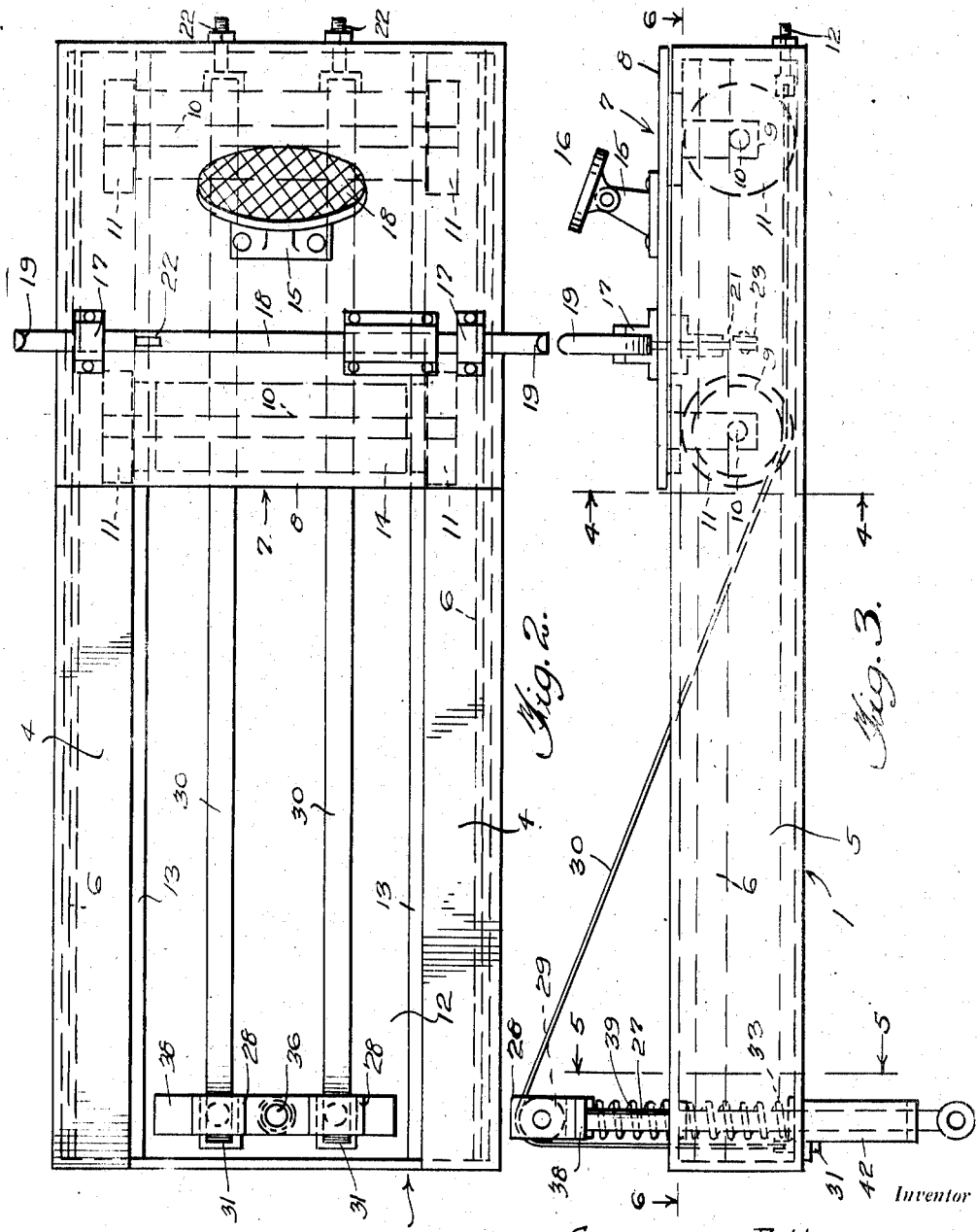

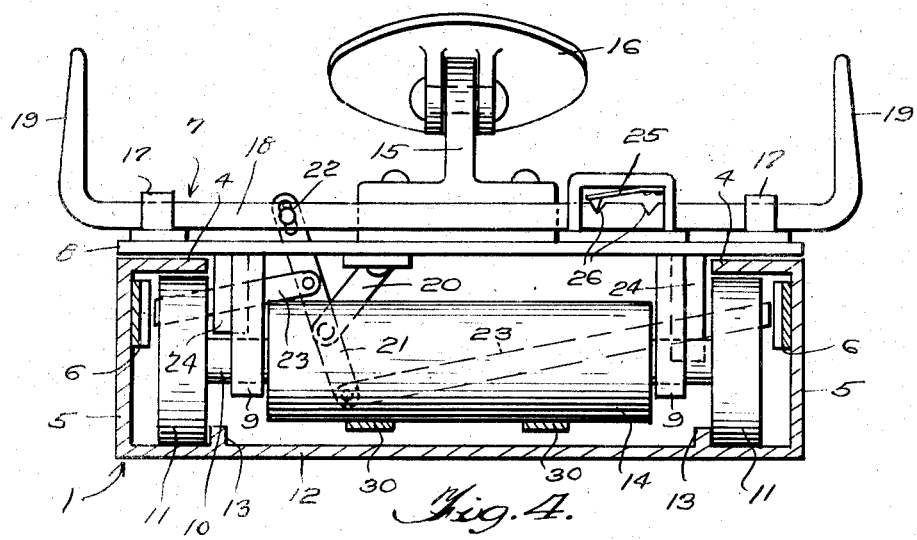

Oct. 13, 1942.  C. F. HADDEN  2,298,761
CONTROL DEVICE
Filed Oct. 14, 1941  6 Sheets-Sheet 4
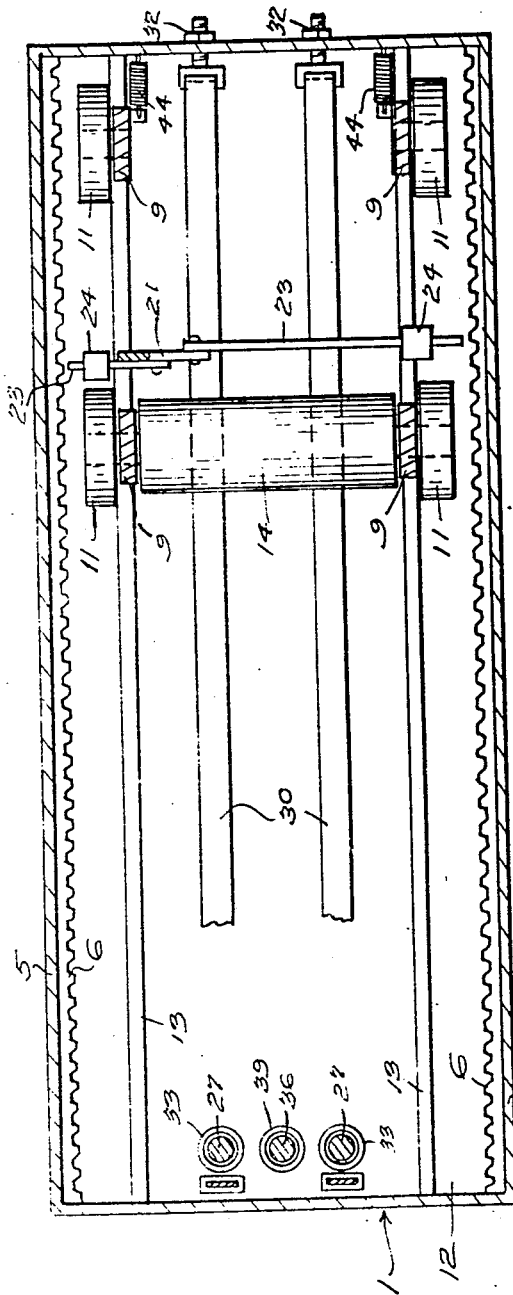
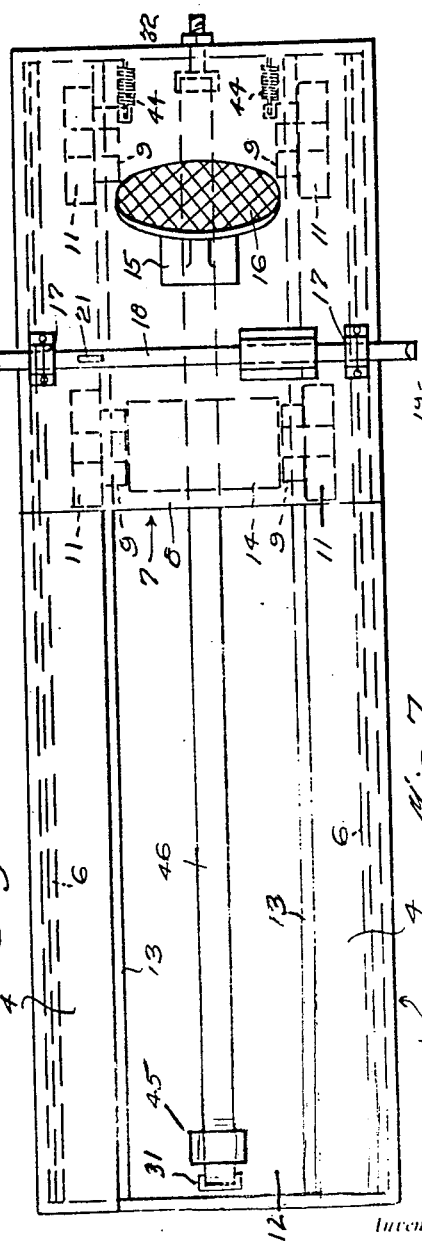
Inventor
CALLENDER F. HADDEN,
By *Clarence A. O'Brien*
Attorney Oct. 13, 1942.                C. F. HADDEN                2,298,761
                             CONTROL DEVICE
                          Filed Oct. 14, 1941         6 Sheets-Sheet 5
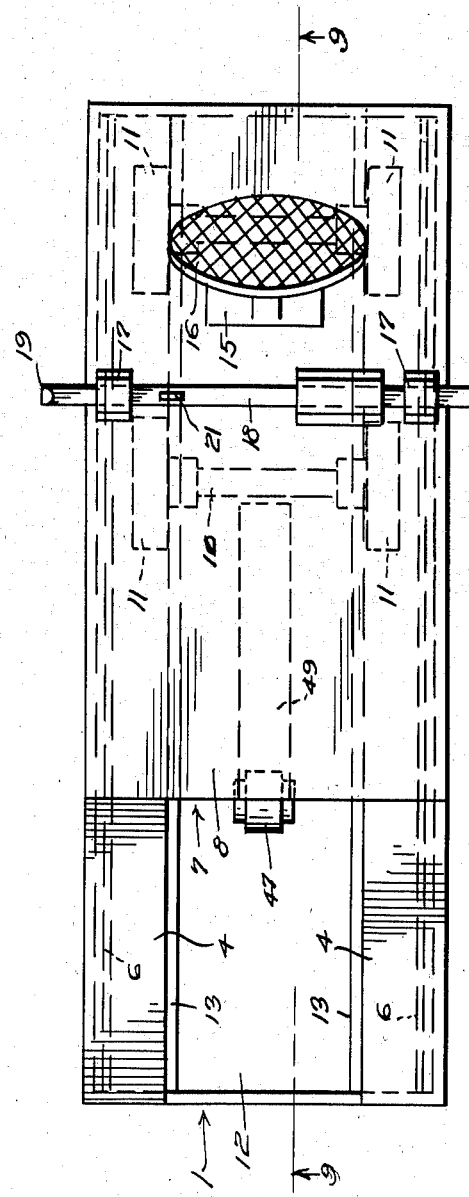
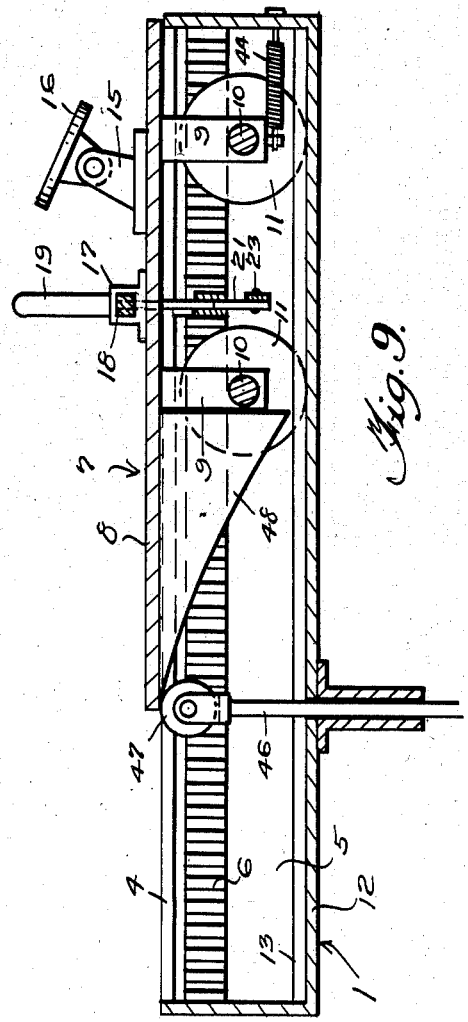
Inventor
CALLENDER F. HADDEN,
By *Clarence AO'Brien*
Attorney Oct. 13, 1942.　　　C. F. HADDEN　　　2,298,761
CONTROL DEVICE
Filed Oct. 14, 1941　　　6 Sheets-Sheet 6
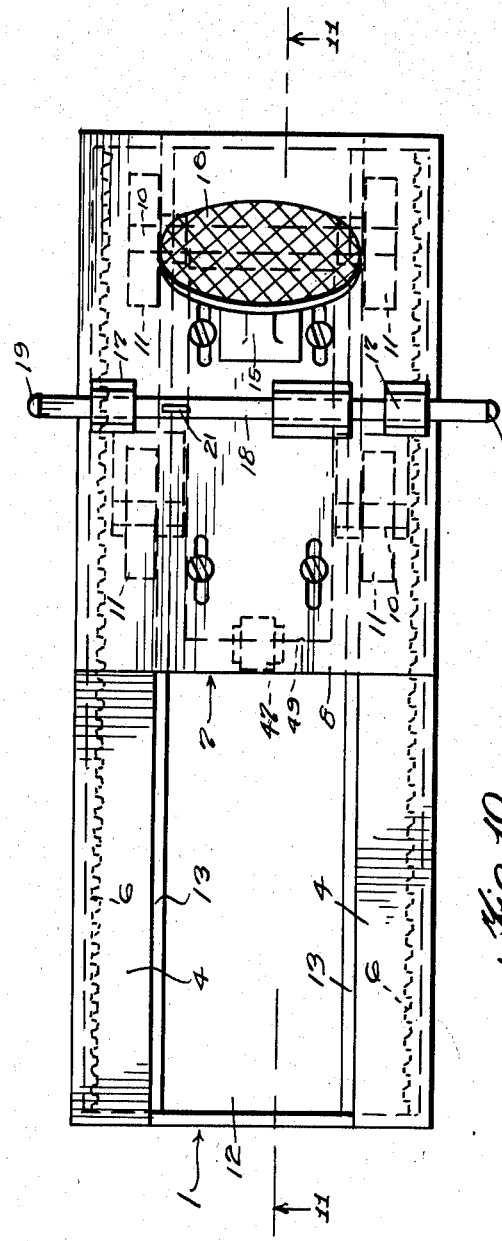
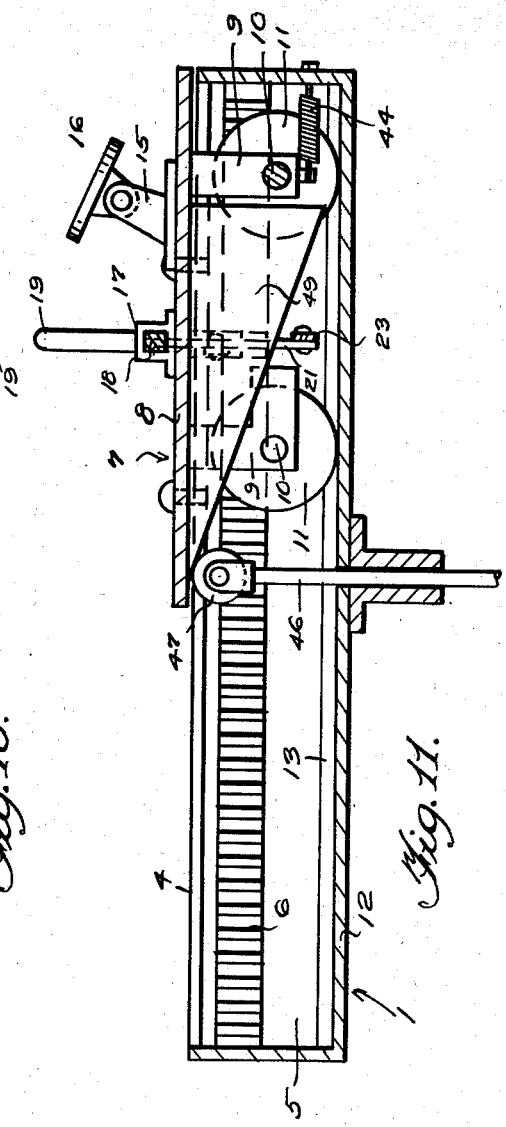
Inventor
CALLENDER F. HADDEN,
By *Clarence A. O'Brien*
Attorney Patented Oct. 13, 1942

2,298,761

UNITED STATES PATENT OFFICE 2,298,761

CONTROL DEVICE

Callender Faysoux Hadden, New Orleans, La.

Application October 14, 1941, Serial No. 414,955

6 Claims. (Cl. 74—512)

The present invention relates to new and useful improvements in control devices, particularly for motor vehicles, although it will be understood, of course, that the device may be used in connection with any other type of vehicle, machine or apparatus for which it may be found adapted and desirable.

The primary object of the invention is to provide, in a manner as hereinafter set forth, novel means whereby the accelerator, brakes and clutch of an automobile or other vehicle or device may be conveniently controlled with the feet, thus leaving both hands free at all times to be used for other purposes.

Another very important object of the invention is to provide a control device of the aforementioned character which may be readily locked in any position, the locking means being operable by the same foot which actuates the device.

Still another very important object of the invention is to provide a foot-operated control device of the character described which may be expeditiously and accurately adjusted as desired to meet various conditions.

Other objects of the invention are to provide a control device of the character set forth which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a top plan view of the device.

Figure 3 is a view in side elevation of the device.

Figure 4 is a cross-sectional view, taken substantially on the line 4—4 of Figure 3.

Figure 5 is a cross-sectional view, taken substantially on the line 5—5 of Figure 3.

Figure 6 is a view in horizontal section, taken substantially on the line 6—6 of Figure 3.

Figure 7 is a top plan view of another embodiment of the device.

Figure 8 is a top plan view, showing another modification.

Figure 9 is a view in vertical longitudinal section, taken substantially on the line 9—9 of Figure 8.

Figure 10 is a top plan view of another modification.

Figure 11 is a view in vertical longitudinal section, taken substantially on the line 11—11 of Figure 10.

Figure 1:
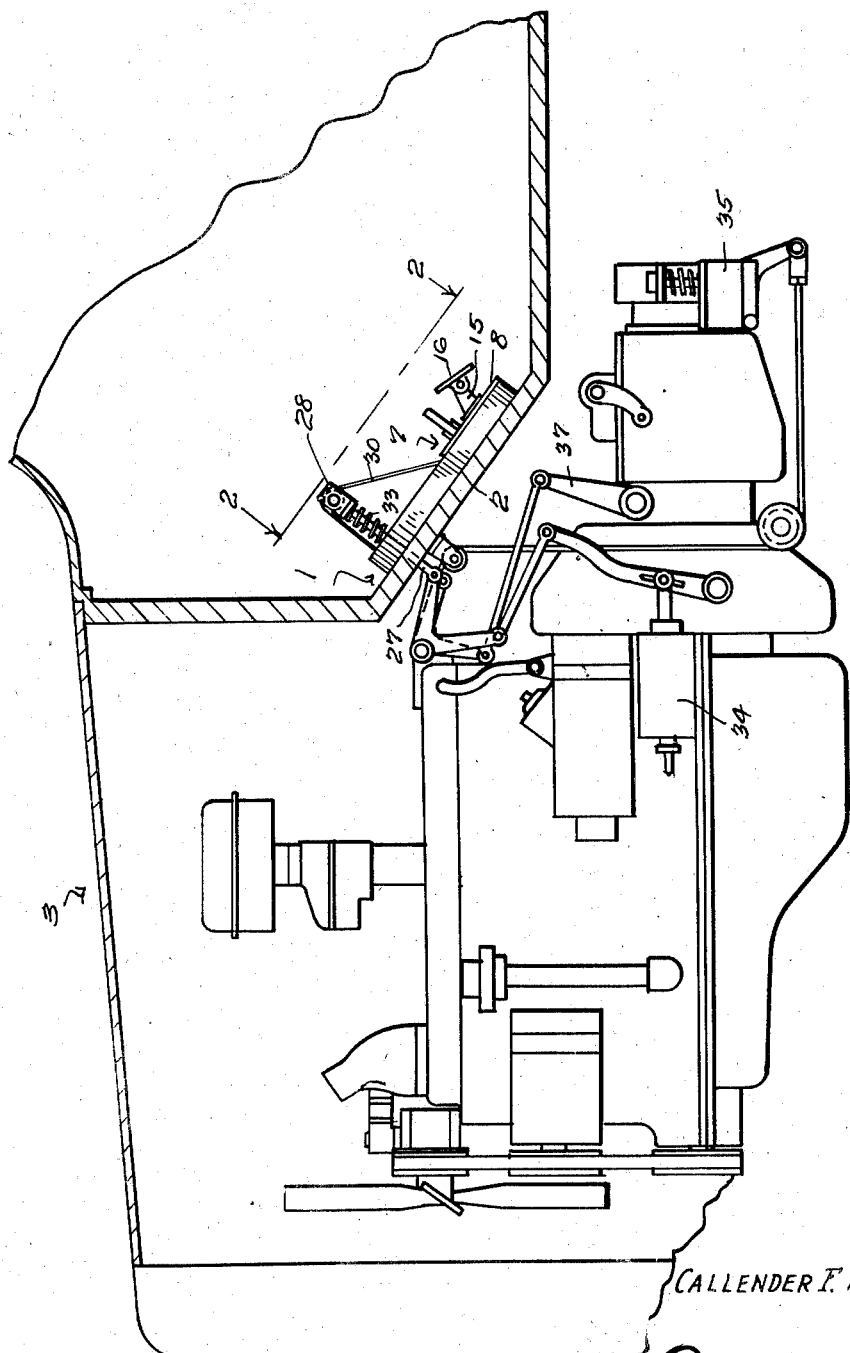
Figure 1 is a view in side elevation of a control device constructed in accordance with the present invention, showing said device installed for operation in an automobile, a portion of said automobile being shown in vertical longitudinal section.

Referring now to the drawings in detail, it will be seen that reference numeral 1 designates generally a relatively flat, elongated housing which may be of any suitable metal. The housing 1 is to be firmly secured in any desired manner on the toe board 2 of a vehicle 3. As illustrated to advantage in Figures 4 and 5 of the drawings, the housing 1 is substantially channel-shaped in cross-section and is provided, on its upper edges, with longitudinally extending, inturned retaining flanges 4. Mounted longitudinally on the side walls 5 of the housing 1, beneath the flanges 4, is a pair of rack bars 6 the purpose of which will be presently set forth.

A foot-operated carriage 7 is operable longitudinally on the housing 1. The carriage 7 comprises a plate 8 which is located above the housing 1. Depending from the plate 8 into the housing 1 is a plurality of suitable bearings 9. Transverse shafts 10 are journaled in the bearings 9. Mounted on the end portions of the shafts 10 are supporting wheels 11 which are adapted to travel longitudinally on the bottom 12 of the housing 1 beneath the retaining flanges 4. Longitudinal guides 13 for the wheels 11 are provided on the bottom 12 of the housing 1. Mounted on the front shaft 10, between the bearings 9, is a roller 14, the purpose of which will also be presently set forth.

Mounted on the plate 8 is a bracket 15. A foot plate 16 is rockably mounted on the bracket 15. Slidable in guides 17 which are provided therefor on the plate 8, forwardly of the bracket 15, is a foot-operated bar 18 which terminates in upturned end portions 19. Mounted beneath the plate 8 is a bracket 20 having pivotally mounted thereon a lever 21. One end portion of the lever 21 is operatively connected to the bar 18 by a pin and slot connection 22. Latches 23 are pivotally connected to the lever 21 on opposite sides of the axis of said lever. The latches 23 are operable in suitable guides 24 which are mounted beneath the plate 8. The free end portions of the latches 23 are engageable with the rack bars 6 for releasably securing the carriage 7 in any desired position. Mounted on the bar 18 is a spring latch 25. The latch 25 is engageable in notches 26 in the bar 18 for securing the latches 23 in projected or retracted position.

Slidably mounted for vertical reciprocation in the forward end portion of the housing 1 are plungers 27. Journaled in guides 28 on the upper ends of the plungers 27 are pulleys 29. Operating straps 30 of suitable material are trained over the pulleys 27 and have one end adjustably secured, as at 31, in the forward end portion of the housing 1. The straps 30 pass under the roller 14 and have their other ends adjustably connected, as at 32, to the rear end of the housing 1. The straps 30 are operable in the guides 28 and said straps are adapted to depress the plungers 27 against the tension of coil springs 33 which are provided for said plungers. As seen in Figure 1 of the drawings, the plungers 27 are to be operatively connected in any suitable manner to the service and emergency brakes 34 and 35, respectively, of the vehicle.

Slidable between the plungers 27 is a third plunger 36 which is to be operatively connected to the clutch 37 of the vehicle. Mounted on the upper end portion of the plunger 36 is a crosshead or the like 38 through which the plungers 27 are slidable. A coil spring 39 yieldingly urges the plunger 36 upwardly. The crosshead 38 is engageable by the guides 28 for moving the plunger 36 downwardly with the plungers 27 against the tension of the spring 39. The plunger 36 includes a threaded lower portion 40. Adjusting nuts 41 are threaded on the portion 40 for adjusting the plunger 36 and the crosshead 38 relative to the members 28 on the plungers 27. The nuts 41, it will be noted, are engaged beneath the bottom 12 of the housing 1. A substantially U-shaped guide 42 is provided beneath the housing 1 for the plungers 27 and 36.

It is thought that the operation of the device will be readily apparent from a consideration of the foregoing. Briefly, to depress the plungers 27 and 36, a foot is engaged on the plate 16 and the carriage 7 is moved forwardly on the housing 1. Thus, the roller 14, traveling on the straps 30, pulls the plungers 27 downwardly against the tension of the coil springs 33. As the plungers 27 move downwardly the guides 28 engage the crosshead 38 and force the plunger 36 downwardly against the tension of its coil spring 39. Then, by shifting the foot into engagement with one of the upturned end portions 19 of the bar 18 and actuating said bar, the latches 23 may be projected into engagement with the rack bars 6 for firmly locking the carriage 7 in any desired position. Coil springs 44 (see Fig. 6) retract the carriage 7 when the latches 23 are disengaged from the rack bars 6.

In Figure 7 of the drawings, there is shown an embodiment for actuating an accelerator. Toward this end, the device comprises a single plunger 45 to be operatively connected to the accelerator. Then, a strap 46, operable by the roller 14 on the carriage 7, depresses the plunger 45.

In the modification illustrated in Figures 8 and 9 of the drawings, a vertically slidable plunger 46 extends upwardly into the housing 1. A roller 47 is journaled on the upper end of the plunger 46. Mounted beneath the forward end portion of the comparatively long plate of the carriage 7 is a cam 48. The cam 48 is adapted to travel on the roller 47 for depressing the plunger 46 when the carriage 7 is moved forwardly in the housing 1.

Referring now to the embodiment of Figures 10 and 11 of the drawings, reference numeral 49 designates a cam which is adjustably mounted beneath the plate 8 of the carriage 7. Of course, the adjustable cam 49 travels on the roller 47 of the plunger 46 for depressing the latter. As seen in Figure 10 of the drawings, the cam 49 is wide enough to engage two or more plungers.

It is believed that the many advantages of a control device constructed in accordance with the present invention will be readily understood, and although preferred embodiments of said device are as illustrated and described, it is to be understood that further modifications and changes in the details of construction may be resorted to which will fall within the scope of the invention as claimed.

What is claimed is:

1. A control device of the character described comprising an elongated housing, a plunger slidable in said housing, rack bars mounted longitudinally in the housing, a foot-operated carriage movable longitudinally on the housing, said carriage including a plate and supporting wheels on said plate operable in the housing, a slidable foot-operated bar mounted transversely on the plate, a lever pivotally mounted beneath the plate and operatively connected to said bar, and latches operatively connected to said lever and engageable with the rack bars for releasably securing the carriage against movement relative to the housing.

2. A control device of the character described comprising an elongated, substantially channel-shaped housing, a plunger slidable in said housing, a carriage movable longitudinally on the housing, said carriage including a plate positioned above the housing and supporting wheels for said plate operable in said housing, longitudinal guides for the wheels in the housing, longitudinal retaining flanges for the wheels on the upper portions of the housing, rack bars mounted longitudinally on the side walls of the housing, a footplate mounted on the first-named plate, a slidable foot-operated bar mounted transversely on said first-named plate and including upturned end portions, a lever pivotally mounted beneath said first-named plate and operatively connected to the foot bar, latches operatively connected to said lever and engageable with the rack bars for releasably securing the carriage against movement relative to the housing, resilient latch means on the first-named plate for releasably securing the foot bar against movement, and means operatively connecting the plunger to the carriage for actuation thereby.

3. A control device of the character described comprising a housing, a plunger slidable in said housing, a flexible member operatively connected to the plunger and having its ends anchored to the housing, a carriage operable on the housing, and a roller on the carriage operatively engaged with said flexible member for actuating the plunger.

4. A control device of the character described comprising a housing, a plunger slidably mounted on said housing, spring means for actuating the plunger in one direction, a pulley journaled on the plunger, a flexible member having its ends anchored to the housing, said member being trained over the pulley, a foot-operated carriage movable on the housing, and a roller on said carriage engaged with the flexible member for actuating the plunger in the opposite direction.

5. A control device of the character described comprising a housing, a plurality of plungers slidably mounted in said housing, pulleys journaled on said plungers, spring means for actuating the plungers in one direction, straps trained over the pulleys and having their ends anchored to the housing, a foot-operated carriage movable on the housing, a roller on said carriage engaged with the straps for actuating the plungers in the opposite direction, another plunger slidably mounted in the housing, and means operatively connecting said other plunger to the first-named plungers for actuation thereby when said plungers are moved in said opposite direction.

6. A control device of the character described comprising an elongated housing, a plunger slidable in the housing, a foot-operated carriage movable in the housing, said carriage including a plate and supporting wheels mounted beneath said plate, a cam adjustably mounted beneath the plate and engageable with the plunger for moving said plunger in one direction, and foot-operated means on the carriage engageable with the housing for releasably locking said carriage against movement relative to said housing.

CALLENDER F. HADDEN.